United States Patent
Jung et al.

(10) Patent No.: US 10,146,557 B2
(45) Date of Patent: Dec. 4, 2018

(54) METHOD AND ELECTRONIC DEVICE FOR INITIALIZING MEMORY AND UPDATING FIRMWARE

(71) Applicant: Samsung Electronics Co., Ltd., Gyeonggi-do (KR)

(72) Inventors: Won-Suk Jung, Gyeonggi-do (KR); Jeong-Han Kim, Gyeonggi-do (KR); Woo-Kwang Lee, Gyeonggi-do (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 111 days.

(21) Appl. No.: 15/065,009

(22) Filed: Mar. 9, 2016

(65) Prior Publication Data
US 2016/0266838 A1 Sep. 15, 2016

(30) Foreign Application Priority Data
Mar. 10, 2015 (KR) .................. 10-2015-0033219

(51) Int. Cl.
*G06F 9/44* (2018.01)
*G06F 9/4401* (2018.01)

(52) U.S. Cl.
CPC .......... *G06F 9/4416* (2013.01); *G06F 9/4401* (2013.01); *G06F 9/4408* (2013.01)

(58) Field of Classification Search
CPC ..... G06F 9/4416; G06F 9/4401; G06F 9/4408
See application file for complete search history.

(56) References Cited

U.S. PATENT DOCUMENTS

| 8,055,957 | B2 | 11/2011 | Kondo | |
| 2007/0088940 | A1* | 4/2007 | Conley | G11C 16/20 713/1 |
| 2012/0216049 | A1* | 8/2012 | Boivie | G06F 21/57 713/189 |

* cited by examiner

Primary Examiner — Stefan Stoynov
(74) Attorney, Agent, or Firm — Cha & Reiter, LLC

(57) ABSTRACT

A method for initializing a memory that is part of an electronic device, comprising: receiving a sequence for initializing the memory from an external booting device; and causing the memory to perform initialization by using a first command that is generated based on the sequence.

8 Claims, 12 Drawing Sheets

METHOD AND ELECTRONIC DEVICE FOR INITIALIZING MEMORY AND UPDATING FIRMWARE

CLAIM OF PRIORITY

This application claims the benefit under 35 U.S.C. § 119(a) of a Korean patent application filed in the Korean Intellectual Property Office on Mar. 10, 2015 and assigned Serial No. 10-2015-0033219, the entire disclosure of which is incorporated herein by reference.

TECHNICAL FIELD

The present disclosure relates to electronic devices, and more particularly to a method and apparatus for initializing memory and updating firmware.

BACKGROUND

A memory is a storage device enabling the reading, writing, and deleting of data such as software binary user data of an electronic device. When NAND flash memory lifetime issues or firmware bugs, or internal metadata corruption occur in the memory under an environment of an electronic device, the software binaries inside the memory cannot be loaded, leading to a failure to operate the electronic device.

When the electronic device fails to normally operate due to problems of the memory embedded in the electronic device, the user needs to exchange printed circuit boards (PCBs), resulting in increased costs. Further, when the firmware of the memory needs an update, such update may be possible only when the memory is initialized.

The above information is presented as background information only to assist with an understanding of the present disclosure. No determination has been made, and no assertion is made, as to whether any of the above might be applicable as prior art with regard to the present disclosure.

SUMMARY

An aspect of various embodiments of the present disclosure is to provide methods and devices for initializing the memory and updating the firmware for addressing the foregoing or other issues.

According to aspects of the disclosure, a method is provided for initializing a memory that is part of an electronic device, comprising: receiving a sequence for initializing the memory from an external booting device; and causing the memory to perform initialization by using a first command that is generated based on the sequence.

According to aspects of the disclosure, an electronic device is provided, comprising: a memory; and at least one processor operatively coupled to the memory, configured to: receive a sequence for initializing the memory from an external booting device; and cause the memory to perform initialization by using a first command that is generated based on the sequence.

According to aspects of the disclosure, a method is provided for updating a firmware of a memory, comprising: receiving a sequence for updating the firmware from an external booting device; and causing the memory to update the firmware by using a first command that is generated based on the sequence.

According to aspects of the disclosure, an electronic device is provided, comprising: a memory; and at least one processor configured to: receive a sequence for updating firmware driving the memory from an external booting device; and cause the memory to update the firmware by using a first command that is generated based on the sequence.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

Throughout the drawings, like reference numerals will be understood to refer to like parts, components, and structures.

DETAILED DESCRIPTION

Figure 1:
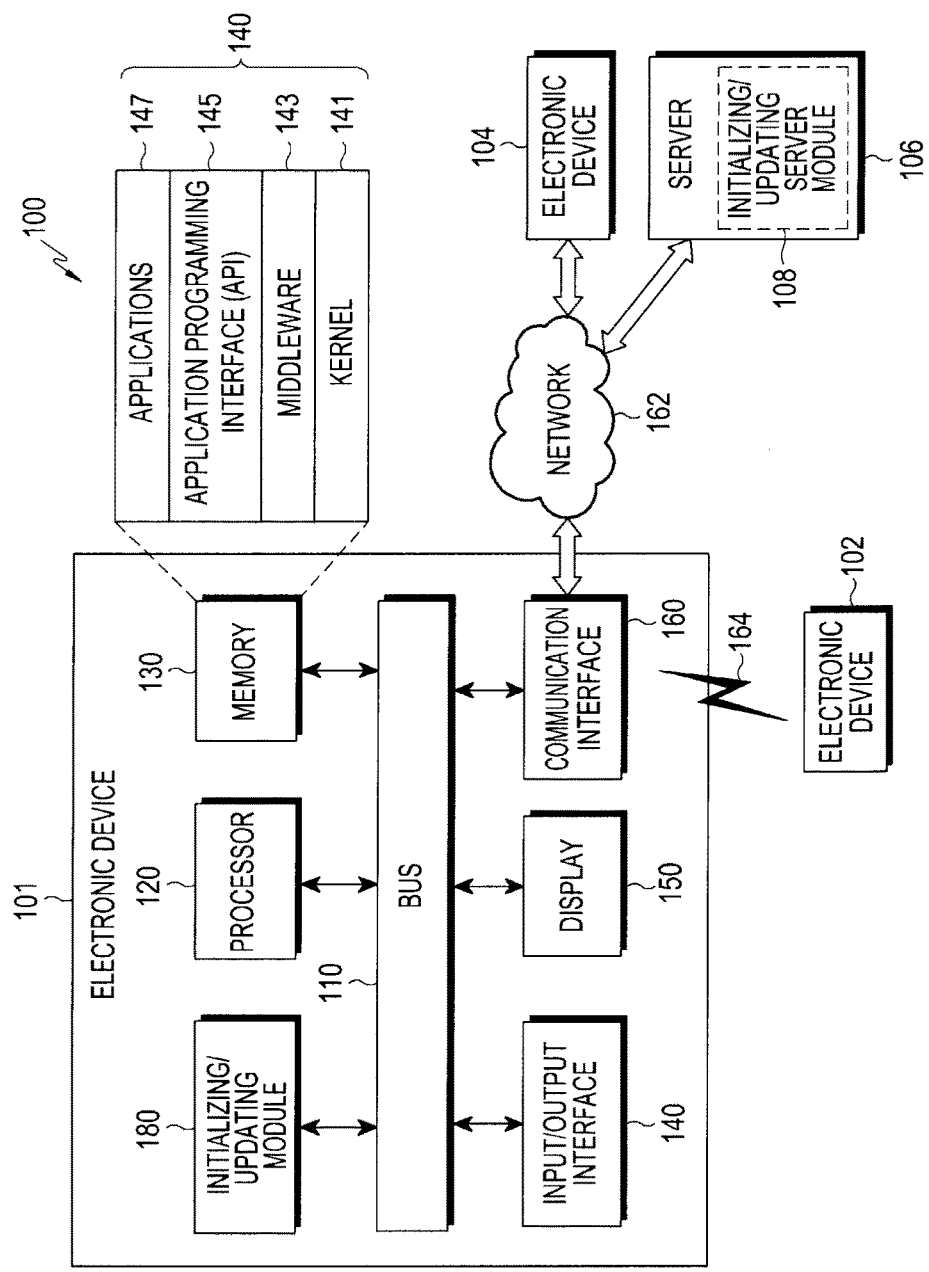
FIG. 1 is a diagram of an example of an electronic device, according to an embodiment of the present disclosure.

Hereinafter, embodiments of the present disclosure are described with reference to the accompanying drawings. However, it should be appreciated that the present disclosure is not limited to the embodiments, and all changes and/or equivalents or replacements thereto also belong to the scope of the present disclosure. The same or similar reference denotations may be used to refer to the same or similar elements throughout the specification and the drawings.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and do not limit the components. These terms are only used to distinguish one component from another. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware." Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the present disclosure. It is to be understood that the singular forms "a," "an," and "the" include plural references unless the context clearly dictates otherwise. All terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (e.g., smart glasses, a head-mounted device (HMD), electronic clothes, an electronic bracelet, an electronic necklace, an electronic appcessory, an electronic tattoo, a smart mirror, or a smart watch).

According to an embodiment of the present disclosure, the electronic device may be a smart home appliance. For example, examples of the smart home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to an embodiment of the present disclosure, examples of the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (e.g., a sailing navigation device or a gyro compass), avionics, security devices, vehicular head units, industrial or home robots, automatic teller's machines (ATMs), point of sales (POS) devices, or Internet of Things devices (e.g., a bulb, various sensors, an electric or gas meter, a sprinkler, a fire alarm, a thermostat, a street light, a toaster, fitness equipment, a hot water tank, a heater, or a boiler).

According to various embodiments of the disclosure, examples of the electronic device may include at least one of part of furniture or building/structure, an electronic board, an electronic signature receiving device, a projector, or various measurement devices (e.g., devices for measuring water, electricity, gas, or electromagnetic waves). According to an embodiment of the present disclosure, the electronic device may be one or a combination of the above-listed devices. According to an embodiment of the present disclosure, the electronic device may be a flexible electronic device. The electronic device disclosed herein is not limited to the above-listed devices, and may include new electronic devices depending on the development of technology.

Hereinafter, electronic devices are described with reference to the accompanying drawings, according to various embodiments of the present disclosure. As used herein, the term "user" may denote a human or another device (e.g., an artificial intelligent electronic device) using the electronic device.

FIG. 1 is a diagram of an example of an electronic device 101, according to an embodiment of the present disclosure. As illustrated, the electronic device 101 may be part of a network environment 100. The electronic device 101 may include a bus 110, a processor 120, a memory 130, an input/output interface 150, a display 160, a communication interface 170, and an initializing/updating module 180. In some embodiments, the electronic device 101 may exclude at least one of the components or may add another component.

The bus 110 may include a circuit for connecting the components 120 to 180 with one another and transferring communications (e.g., control messages and/or data) between the components.

The processor 120 may include any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), etc. For example, the processor 120 may include one or more of a central processing unit (CPU), an application processor (AP), or a communication processor (CP). The processor 120 may perform control on at least one of the other components of the electronic device 101, and/or perform an operation or data processing relating to communication. The processor 120 may be denoted a controller, or the processor 120 may include a controller as part thereof.

The memory 130 may include any suitable type of volatile or non-volatile memory, such as Random-access Memory (RAM), Read-Only Memory (ROM), Network Accessible Storage (NAS), cloud storage, a Solid State Drive (SSD), etc. For example, the memory 130 may store commands or data related to at least one other component of the electronic device 101. According to an embodiment of the present disclosure, the memory 130 may store software and/or a program 140. The program 140 may include, e.g., a kernel 141, middleware 143, an application programming interface (API) 145, and/or an application program 147 (or "application"). At least a portion of the kernel 141, middleware 143, or API 145 may be denoted an operating system (OS).

For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example. A plurality of applications 147 may be provided. The middleware 143 may control work requests received from the applications 147, e.g., by allocation the priority of using the system resources of the electronic device 101 (e.g., the bus 110, the processor 120, or the memory 130) to at least one of the plurality of applications 134.

The API 145 is an interface allowing the application 147 to control functions provided by the kernel 141 or the middleware 143. For example, the API 133 may include at least one interface or function (e.g., a command) for filing control, window control, image processing or text control.

As used herein, the term "application" may be denoted an application program as well.

The input/output interface 150 may serve as an interface that may, e.g., transfer commands or data input from a user or other external devices to other component(s) of the electronic device 101. Further, the input/output interface 150 may output commands or data received from other component(s) of the electronic device 101 to the user or the other external device.

The display 160 may include, e.g., a liquid crystal display (LCD), a light-emitting diode (LED) display, an organic light-emitting diode (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user.

For example, the communication interface 170 may set up communication between the electronic device 101 and an external electronic device (e.g., a first electronic device 102, a second electronic device 104, or a server 106). For example, the communication interface 170 may be connected to the network 162 through wireless or wired communication to communicate with the external electronic device.

Here, the first external electronic device 102 may be, e.g., a beacon. The first external electronic device 102 may communicate beacon signals 164 at predetermined time intervals. The first external electronic device 102 may communicate beacon signals 164 based on various communication protocols, such as Bluetooth, Wi-Fi, or ANT.

The wireless communication may use at least one of, e.g., long-term evolution (LTE), long-term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. The wired connection may include at least one of universal serial bus (USB), high definition multimedia interface (HDMI), recommended standard 232 (RS-232), or plain old telephone service (POTS). The network 162 may include at least one of a telecommunication network, e.g., a computer network (e.g., LAN or WAN), the Internet, or a telephone network.

The first and second external electronic devices 102 and 104 each may be a device of the same or a different type than the electronic device 101. According to an embodiment of the present disclosure, the server 106 may include a group of one or more servers. According to an embodiment of the present disclosure, all or some of operations executed on the electronic device 101 may be executed on another or multiple other electronic devices (e.g., the electronic devices 102 and 104 or server 106). According to an embodiment of the present disclosure, when the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

According to an embodiment of the present disclosure, the initializing/updating module 180 may support to drive the electronic device 101 by performing at least one operation of operations (or functions) implemented on the electronic device 101. For example, the server 106 may include an initializing/updating server module 108 that may support the initializing/updating module 180 implemented in the electronic device 101. For example, the initializing/updating server module 108 may include at least one element of the initializing/updating module 180 to perform (e.g., instead perform) at least one operation of operations performed by the initializing/updating module 180.

The initializing/updating module 180 may process at least part of information obtained from other elements (e.g., at least one of the processor 120, the memory 130, the input/output interface 150, or the communication interface 170) and may use the same in various manners. For example, the initializing/updating module 180 may control at least some functions of the electronic device 101 using the processor 120 or independently from the processor 120 so that the electronic device 101 may interwork with another electronic device (e.g., the electronic device 102 or 104 or the server 106). The initializing/updating module 180 may be integrated with the processor 120 or the communication interface 170. According to an embodiment of the present disclosure, at least one configuration of the initializing/updating module 180 may be included in the server 106 (e.g., the initializing/updating server module 108) and may be supported for at least one operation implemented on the initializing/updating module 180 from the server 106.

Figure 2:
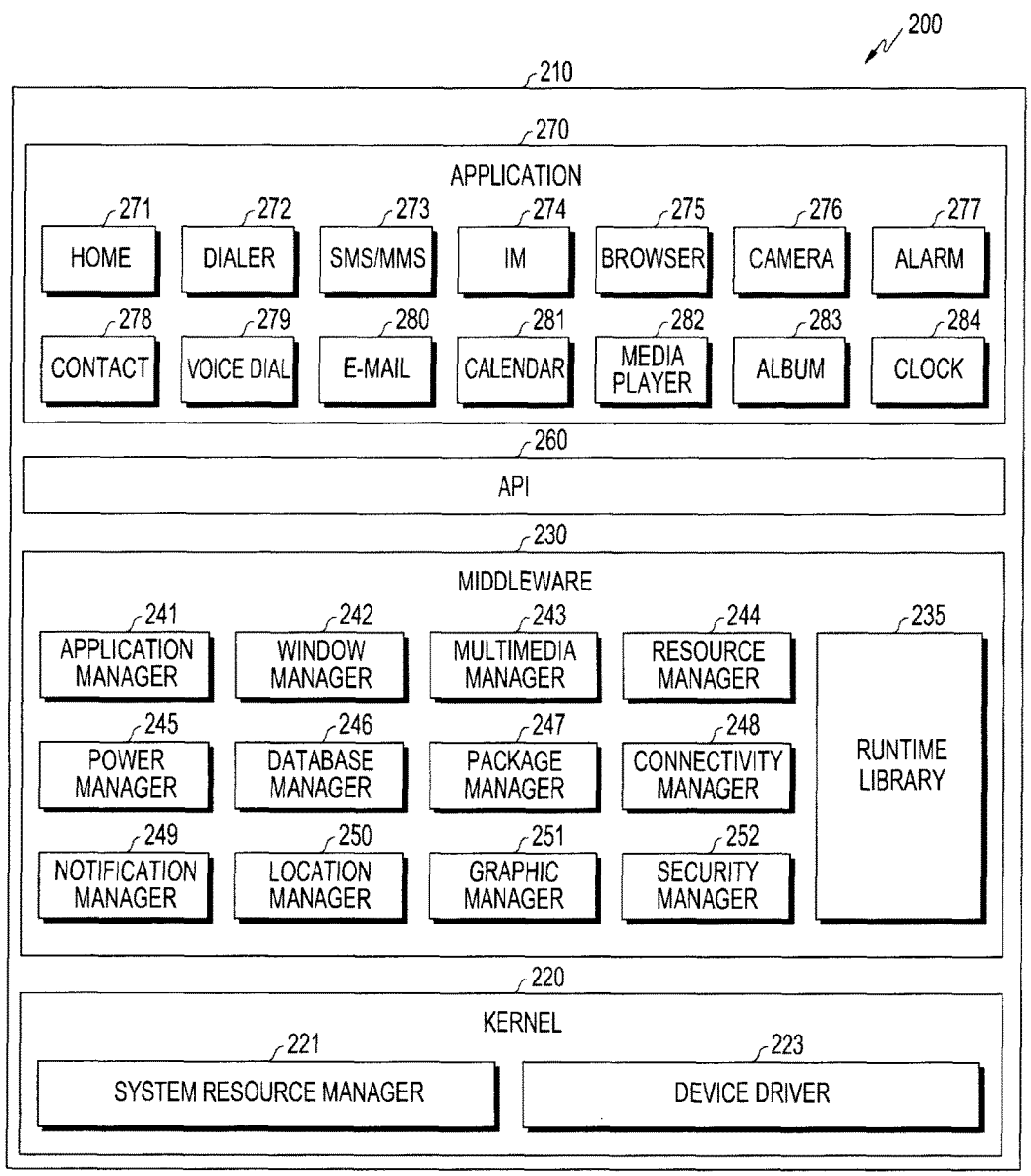
FIG. 2 is a block diagram of an example of a program module, according to an embodiment of the present disclosure.

FIG. 2 is a block diagram 200 of an example of a program module 210, according to an embodiment of the present disclosure. According to an embodiment of the present disclosure, the program module 210 (e.g., the program 140) may include an operating system (OS) controlling resources related to the electronic device (e.g., the electronic device 101) and/or various applications (e.g., the application processor 147) executed in the operating system. The operating system may include, e.g., Android, iOS, Windows, Symbian, Tizen, or Bada.

The program 210 may include, e.g., a kernel 220, middleware 230, an application programming interface (API) 260, and/or an application 270. At least a part of the program module 210 may be preloaded on the electronic device or may be downloaded from a server (e.g., the server 106).

The kernel 220 (e.g., the kernel 141 of FIG. 1) may include, e.g., a system resource manager 221 or a device driver 223. The system resource manager 221 may perform control, allocation, or recovery of system resources. According to an embodiment of the present disclosure, the system resource manager 221 may include a process managing unit, a memory managing unit, or a file system managing unit. The device driver 223 may include, e.g., a display driver, a camera driver, a Bluetooth driver, a shared memory driver, a USB driver, a keypad driver, a Wi-Fi driver, an audio driver, or an inter-process communication (IPC) driver. The middleware 230 may provide various functions to the application 270 through the API 260 so that the application 270 may efficiently use limited system resources in the electronic device or provide functions jointly required by applications 270. According to an embodiment of the present disclosure, the middleware 230 (e.g., middleware 143) may include at least one of a runtime library 235, an application manager 241, a window manager 242, a multimedia manager 243, a resource manager 244, a power manager 245, a database manager 246, a package manager 247, a connectivity manager 248, a notification manager 249, a location manager 250, a graphic manager 251, or a security manager 252.

The runtime library 235 may include a library module used by a compiler in order to add a new function through a programming language while, e.g., the application 270 is being executed. The runtime library 235 may perform input/output management, memory management, or operation on arithmetic functions.

The application manager 241 may manage the life cycle of at least one application of, e.g., the applications 270. The window manager 242 may manage GUI resources used on the screen. The multimedia manager 243 may grasp formats necessary to play various media files and use a codec appropriate for a format to perform encoding or decoding on media files. The resource manager 244 may manage resources, such as source code of at least one of the applications 270, memory or storage space.

The power manager 245 may operate together with, e.g., a basic input/output system (BIOS) to manage battery or power and provide power information necessary for operating the electronic device. The database manager 246 may generate, search, or vary a database to be used in at least one of the applications 270. The package manager 247 may manage installation or update of an application that is distributed in the form of a package file.

The connectivity manager 248 may manage wireless connectivity, such as, Wi-Fi or Bluetooth. The notification manager 249 may display or notify an event, such as a coming message, appointment, or proximity notification, of the user without interfering with the user. The location manager 250 may manage locational information on the electronic device. The graphic manager 251 may manage graphic effects to be offered to the user and their related user interface. The security manager 252 may provide various security functions necessary for system security or user authentication. According to an embodiment of the present disclosure, when the electronic device (e.g., the electronic device 101) has telephony capability, the middleware 230 may further include a telephony manager for managing voice call or video call functions of the electronic device.

The middleware 230 may include a middleware module forming a combination of various functions of the above-described components. The middleware 230 may provide a specified module per type of the operating system in order to provide a differentiated function. Further, the middleware 230 may dynamically omit some existing components or add new components.

The API 260 (e.g., the API 145) may be a set of, e.g., API programming functions and may have different configurations depending on operating systems. For example, in the case of Android or iOS, one API set may be provided per platform, and in the case of Tizen, two or more API sets may be offered per platform.

The application 270 (e.g., the application processor 147) may include one or more applications that may provide functions such as, e.g., a home 271, a dialer 272, a short message service (SMS)/multimedia messaging service (MMS) 273, an instant message (IM) 274, a browser 275, a camera 276, an alarm 277, a contact 278, a voice dial 279, an email 280, a calendar 281, a media player 282, an album 283, or a clock 284, a health-care (e.g., measuring the degree of workout or blood sugar), or provision of environmental information (e.g., provision of air pressure, moisture, or temperature information).

According to an embodiment of the present disclosure, the application 270 may include an application (hereinafter, "information exchanging application" for convenience) supporting information exchange between the electronic device (e.g., the electronic device 101) and an external electronic device (e.g., the electronic devices 102 and 104). Examples of the information exchange application may include, but is not limited to, a notification relay application for transferring specific information to the external electronic device, or a device management application for managing the external electronic device.

For example, the notification relay application may include a function for relaying notification information generated from other applications of the electronic device (e.g., the SMS/MMS application, email application, healthcare application, or environmental information application) to the external electronic device (e.g., the electronic devices 102 and 104). Further, the notification relay application may receive notification information from, e.g., the external electronic device and may provide the received notification information to the user. The device management application may perform at least some functions of the external electronic device (e.g., the electronic device 102 or 104) communicating with the electronic device (for example, turning on/off the external electronic device (or some components of the external electronic device) or control of brightness (or resolution) of the display), and the device management application may manage (e.g., install, delete, or update) an application operating in the external electronic device or a service (e.g., call service or message service) provided by the external electronic device.

According to an embodiment of the present disclosure, the application 270 may include an application (e.g., a health-care application) designated depending on the attribute (e.g., as an attribute of the electronic device, the type of electronic device is a mobile medical device) of the external electronic device (e.g., the electronic devices 102 and 104). According to an embodiment of the present disclosure, the application 270 may include an application received from the external electronic device (e.g., the server 106 or electronic devices 102 and 104). According to an embodiment of the present disclosure, the application 270 may include a preloaded application or a third party application downloadable from a server. The names of the components of the program module 210 according to the shown embodiment may be varied depending on the type of operating system.

According to an embodiment of the present disclosure, at least a part of the program module 210 may be implemented in software, firmware, hardware, or in a combination of two or more thereof. At least a part of the programming module 210 may be implemented (e.g., executed) by e.g., a processor (e.g., the AP 210). At least a part of the program module 210 may include e.g., a module, program, routine, set of instructions, process, or the like for performing one or more functions.

Figure 3A:
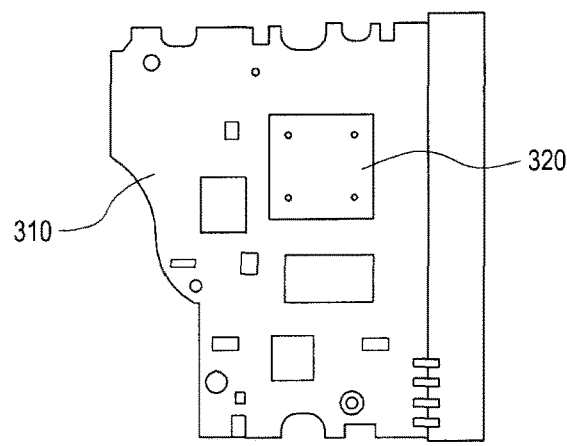
FIG. 3A is a diagram of an example of a memory printed circuit board (PCB), according to an embodiment of the present disclosure.
Figure 3B:
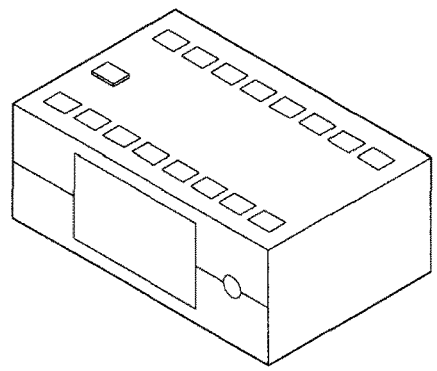
FIG. 3B is a diagram of an example of a device for initializing the memory of FIG. 3A, according to an embodiment of the present disclosure.

FIGS. 3A-B illustrate an example of a memory including a PCB and a device for initializing the memory.

The multimedia card (MMC) includes external flash memory and it may be equipped with a negative AND (NAND) flash memory. The MMC may be used on a mobile phone, a digital camera, a tablet PC and/or any other suitable type of device. Further, the electronic device such as a mobile phone, a digital camera, or a tablet PC may include an internal memory such as an embedded multimedia card (eMMC) or a universal flash storage (UFS). For example, the eMMC 320 is a combination of a flash memory controller and an NAND flash memory. As shown in FIG. 3A, the eMMC 320 is embedded in a printed circuit board (PCB) 320. The eMMC includes the flash memory controller and the NAND flash memory to mitigate difficulty in using the NAND flash memory and to facilitate the development of embedded applications. Further, the UFS (not shown) unites various memory cards with different formats and standards, such as secure digital (SD), compact flash (CF), and MMC, into a single format and standard and this may lead to higher compatibility between memory card devices. Hereinafter, the description focuses on eMMC for ease of description, but the present disclosure is not limited thereto. Rather, the present disclosure may be applicable to a different format or standard of memory (e.g., UFS) embedded in the electronic device 101 as well.

As shown in FIG. 3A, the eMMC 320 that is embedded in the PCB 310 needs to be removed from the PCB 310 when defects occur in the eMMC 320 in order to address the defects. Thereafter, the removed, defective eMMC 320 is repaired by an external device to repair the defective eMMC as shown in FIG. 3B. For example, the external device shown in FIG. 3B may be utilized to repair the defective eMMC 320 through a process for turning the eMMC 320 back to the initial default state as produced in the manufacturing process. However, when the eMMC 320 is removed from the PCB 310 to repair the eMMC 320, the PCB 310 might not be recycled and may need to be exchanged.

The defects of eMMC may occur as a result of hardware problems or damage to data stored in the eMMC. For example, eMMC defects such as the power supply defects and abnormal shift of eMMC state (e.g., due to a failure to enter into the boot mode) may stem from hardware problems. As such, the eMMC defects due to such hardware problems can be addressed not by the external device shown in FIG. 3B but in a hardware-like manner.

As another example, the eMMC may be defective due to, e.g., corruption of information necessary for initializing the eMMC and excessive run time bad blocks (RTBBs) when the metainformation necessary for initializing the eMMC needs to be updated. In such instances, the defective eMMC may be fixed by initializing the eMMC using the external device shown in FIG. 3B. However, since the eMMC needs to be removed from the PCB as described above, the issue of exchanging the PCB arises.

Further, the eMMC may be defective due to a corruption of the firmware of the eMMC, e.g., patch data corruption. In this case, the defective eMMC may be restored by updating the firmware. However, the field firmware update (FFU), a conventional firmware updating method, may be fulfilled only when the eMMC is initialized.

Figure 4:
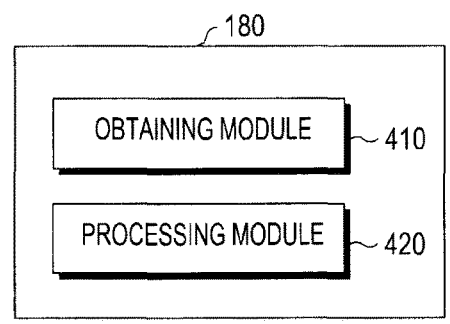
FIG. 4 is a block diagram of an example of an initializing/updating module, according to an embodiment of the present disclosure.

FIG. 4 is a block diagram of an example of an initializing/updating module, according to an embodiment of the present disclosure.

According to an embodiment of the present disclosure, the initializing/updating module 180 of the electronic device 101 may include an obtaining module 410 and a processing module 420. The initializing/updating module 180 may be provided separately from a processor (e.g., the processor 120) or may be integrated at least partially into the processor.

In operation, the obtaining module 410 may receive, from an external booting device, a sequence for initializing a memory (e.g., the memory 130) included in the electronic device 101. The external booting device may include, e.g., an SD card, a universal serial bus (USB), and/or any other suitable type of component. When the memory has defects and so the electronic device 101 does not work, the electronic device 101 may access the memory using a boot loader stored in the external booting device. The memory may be a package including a combination of a controller and a storage device, such as an eMMC or UFS, and it may be embedded in the electronic device 101.

The sequence may include at least one command for controlling the memory. When the memory has defects, the firmware of the memory might not normally work. Accordingly, the initialization of the memory for restoring the defective memory may be carried out through the command to control the memory. Accordingly, the sequence may include at least one command to control the memory in order to initialize the memory. The above-described memory initialization is a scheme for restoring the defective memory and may be a process for turning the memory back to the factory state as produced in the manufacturing process.

In an embodiment, the at least one command may include a command processed by a hardware logic of the memory. As set forth above, when the memory has defects, the firmware might not operate normally. Accordingly, the at least one command may be a hardware-like command processed by the hardware logic of the memory in order to control the memory without using the firmware.

According to an embodiment of the present disclosure, the processing module 420 may perform the initialization of the memory through a first command that is generated based on the sequence. The processing module 420 may generate the first command based on a sequence received from the external booting device in order to initialize the defective memory. As such, the processing module 420 may cause the memory to be initialized so that the initialization of the memory can be performed without having to remove the memory from the PCB.

In an embodiment, the sequence may include at least one command to initialize the memory and an argument associated with the at least one command. The processing module 420 may generate commands for initializing the memory based on the at least one command and the argument associated with the at least one command.

In an embodiment, the first command to instruct the initialization of the memory may be one of at least one command processed by the hardware logic of the memory and to control the memory. As described above, when the memory has defects, the firmware of the memory might not work as well. Accordingly, upon transferring a command using the firmware to the memory, the operation or response corresponding to the transferred command might not normally be operated in the memory. Accordingly, the initialization of the memory may be performed without the firmware by using a hardware-like command for controlling the memory that is executed by the hardware logic of the memory.

For example, the first command may control the memory through at least one control circuit (e.g., a logic circuit) included in the memory. As such, the hardware-like command such as the first command may be a command directly delivered to the hardware through the control circuit and may be different from a command performed through software.

In an embodiment, the processing module 420 may inform the memory of the entry into an initialization mode through a second command that is generated based on the sequence. Further, the processing module 420 may instruct the memory to enter into the initialization mode and conduct initialization through the first command. The initialization mode may be a mode for initializing the memory. The processing module 420 may inform the memory of the entry into the initialization mode through the second command, and the memory may prepare for entry into the initialization mode corresponding to the second command. The processing module 420 may provide the memory with the confirmation of entry into the initialization mode through the first command and may instruct the memory to perform initialization in the initialization mode.

In an embodiment, the first command and the second command each may be processed (e.g., executed) by the hardware logic of the memory. When the memory has defects, the firmware of the memory might not work as well. Thus, the memory may be instructed to do initialization using at least one command for controlling the memory and processed by the hardware logic of the memory, but without using the firmware.

In an embodiment, the argument of the first command may include an authentication key for initialization of the memory. After an intent to enter into the initialization mode is indicated through the second command, an authentication process for entry into the initialization mode may be performed. The argument of the first command may indicate the authentication key corresponding to the authentication process for entry into the initialization mode. The authentication key may be a signature or security key value determined for each manufacturer of the memory.

In an embodiment, the processing module 420 may detect whether the initialization of the memory is complete through a third command that is generated based on the sequence. In order to detect whether the initialization of the memory is complete, the processing module 420 may transfer the third command to the memory. When it is identified through the third command that the initialization of the memory is not complete, the processing module 420 may periodically issue the third command. By doing so, the processing module 420 may detect whether the initialization of the memory is complete.

In an embodiment, upon detecting through the third command that the initialization of the memory is complete, the processing module 420 may initialize the firmware of the memory. When the memory is initialized, the process of initializing the firmware of the memory may ensue.

According to an embodiment of the present disclosure, the obtaining module 410 may receive a sequence for updating the firmware from the external booting device. When the firmware of the memory is damaged or contains errors, the electronic device 101 might not work. In such instances, the electronic device 101 may access the memory through the boot loader stored in the external booting device. By doing this, the electronic device 101 may update the firmware without even initializing the memory.

The sequence may include at least one command to control the memory. When the firmware is damaged or otherwise contains errors, the firmware might not normally operate. Accordingly, the sequence may include at least one command to control the memory.

In an embodiment, the at least one command may be a command that is processed (e.g., executed) by a hardware logic of the memory. As described above, when the firmware is corrupt or contains errors, the firmware might not operate normally. Accordingly, the at least one command may include a hardware-like command (e.g., opcode) that is processed by the hardware logic of the memory in order to control the memory without using the firmware.

According to an embodiment of the present disclosure, the processing module 420 may instruct the memory to update the firmware through the first command that is generated based on the sequence. The processing module 420 may generate the first command based on the sequence received from the external booting device in order to update the firmware when the firmware is corrupt or contains errors. By doing so, the processing module 420 may enable the firmware to be updated even without initializing the memory.

In an embodiment, even when the firmware is operating normally, the processing module 420 may update the firmware through a command for controlling the memory in order to update the firmware without going through the initialization of the memory.

In an embodiment, the sequence may include at least one command and an argument associated with the at least one command. The processing module 420 may generate commands for updating the firmware based on the at least one command and the argument associated with the at least one command.

In an embodiment, the first command for updating the firmware may be processed (e.g., executed) by the hardware logic of the memory. As set forth above, when the firmware is corrupt or contains errors, the firmware might not work properly. Accordingly, upon transferring a command using the firmware to the memory, the operation or response corresponding to the transferred command might not normally be operated in the memory. Accordingly, the processing module 420 may cause the firmware to be updated by using the hardware-like command processed by the hardware logic of the memory.

In an embodiment, the processing module 420 may inform the memory of entry into the update mode for performing the update of the firmware through a second command that is generated based on the sequence. Further, the processing module 420 may instruct the memory to enter into the update mode and update the firmware through the first command. The update mode may be a mode for updating the firmware. The processing module 420 may inform the memory of the entry into the update mode through the second command, and the memory may prepare for entry into the update mode corresponding to the second command. By using the first command, the processing module 420 may cause the memory to enter into the update mode and the firmware to be updated.

In an embodiment, any one of the first command and the second command may be a command for controlling the memory without using the firmware. When the firmware is corrupt or contains errors, the firmware may not be able to work properly. Thus, the memory may be instructed to update the firmware using at least one command for controlling the memory and processed by the hardware logic of the memory.

In an embodiment, the argument of the first command may include an authentication key for updating the firmware. When an intent to enter the update mode is declared through the second command, an authentication process for entry into the update mode may be performed. The argument of the first command may include the authentication key corresponding to the authentication process for entry into the update mode. The authentication key may be a signature or security key value that is specified by the manufacturer of the memory.

In an embodiment, the processing module 420 may detect whether the update of the firmware is complete through a third command that is generated based on the sequence. In order to detect whether the update of the firmware is complete, the processing module 420 may transfer the third command to the memory. When it is identified through the third command that the update of the firmware is not complete, the processing module 420 may periodically issue the third command to the memory. By doing so, the processing module 420 may detect whether the update of the firmware is complete.

In an embodiment, upon detecting through the third command that the update of the firmware is complete, the processing module 420 may reset the memory. The processing module 420 may reset the memory in order to operate the memory after the firmware is updated.

Figure 5:
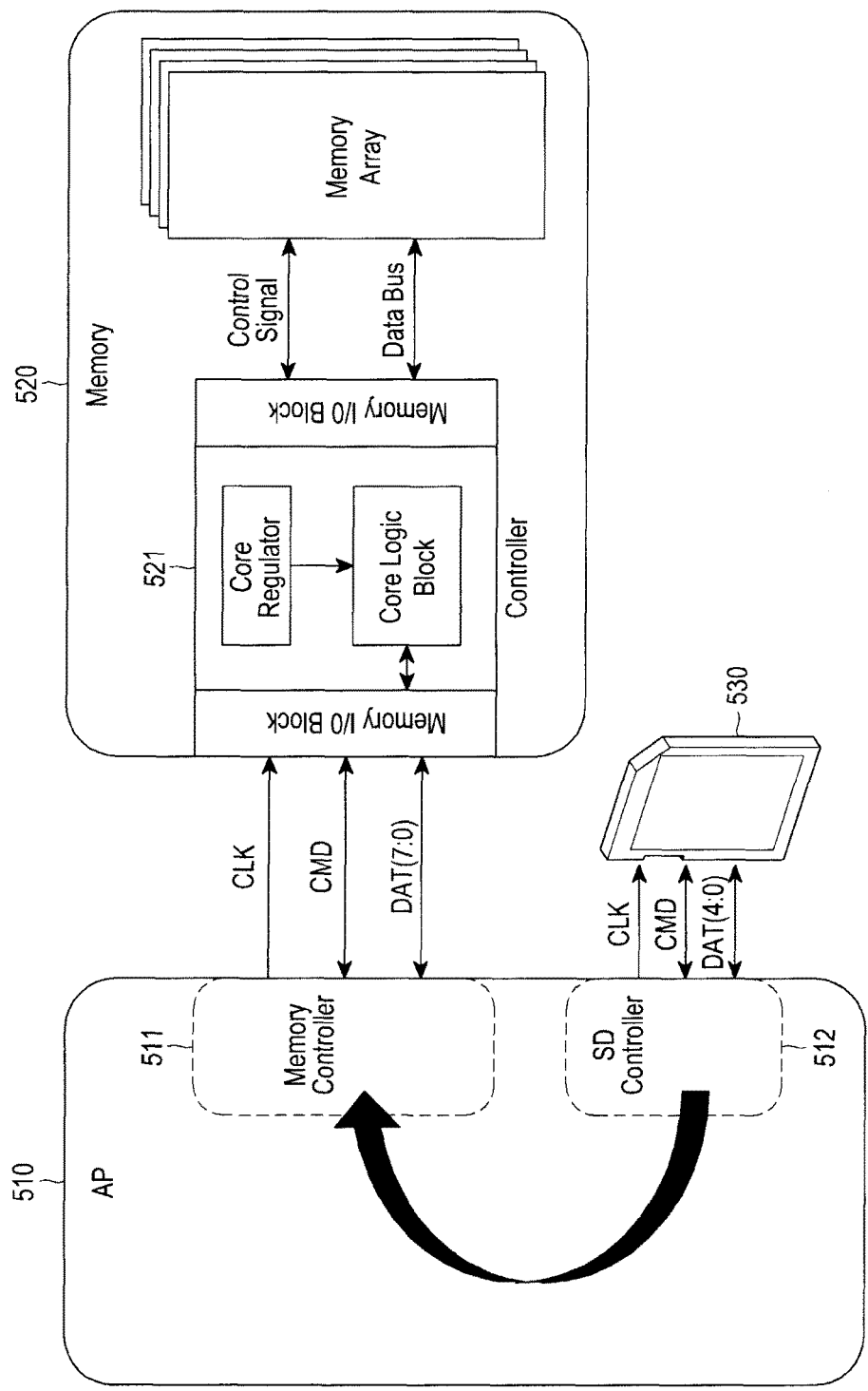
FIG. 5 is a diagram illustrating an example of a process for controlling a memory using an external booting device, according to an embodiment of the present disclosure.

FIG. 5 is a diagram illustrating an example of a process for controlling a memory using an external booting device, according to an embodiment of the present disclosure.

Described with respect to FIG. 5 is a method for controlling a memory 520 in order to initialize the memory 520 or update the firmware of the memory 520 by using a secure digital (SD) card 530, which is an external booting device. Here, the memory 520 may be a memory (e.g., eMMC or UFS) embedded in the electronic device 101.

When the memory 520 is damaged or the firmware is corrupt or contains errors, the electronic device 101 including the AP 510 and the memory 520 might not be able to operate properly. In such case, the electronic device 101 may operate using the boot loader stored in the SD card 530. The AP 510 may include a memory controller 511 for controlling the memory and an SD controller 512 for controlling the SD card 530. The memory controller 511 and the SD controller 512 may be separate from one another or integrated into the same controller.

In an embodiment, the electronic device 101, after using the boot loader of the SD card 530, may receive a sequence for initializing the memory 520 from the SD card 530. For example, after receiving the sequence from the SD controller 512, the SD controller 512 may transfer the sequence to the memory controller 511.

The memory controller 511 may instruct the memory 520 to initialize the memory 520 through a first command that is generated based on the sequence. The controller 521 of the memory 520 may proceed with the initialization of the memory 520 corresponding to the first command. The first command may be a hardware-like command processed by the hardware logic included in the controller 521 and for controlling the memory 520.

In an embodiment, the electronic device 101, after operating using the boot loader of the SD card 530, may receive a sequence for updating the firmware of the memory 520 from the SD card 530. For example, after receiving the sequence from the SD controller 512, the electronic device may transfer the sequence to the memory controller 511.

The memory controller 511 may instruct the memory 520 to update the firmware through a first command that is generated based on the sequence. The controller 521 may proceed with the update of the firmware in response to the first command. The first command may be a hardware-like command processed (e.g., executed) by the hardware logic included in the controller 521 and it may be used to control the memory 520.

As set forth above, when the electronic device 101 does not operate normally due to the defects in the memory 520 or corruption or errors in the firmware, the electronic device 101 may use the boot loader stored in the external booting device such as the SD card 530. Further, the electronic device 101 may receive the sequence for initializing the memory 520 or sequence for updating the firmware from the external booting device such as the SD card 530. The AP 510 included in the electronic device 101 may instruct the initialization of the memory 520 or the update of the firmware through the first command that is generated based on the sequence. For example, the first command may be processed by the hardware logic included in the controller 521 or the memory 520 to directly control the memory 520. By doing so, even when the memory 520 cannot operate normally, the initialization of the memory 520 or the update of the firmware may be carried out.

Figure 6:
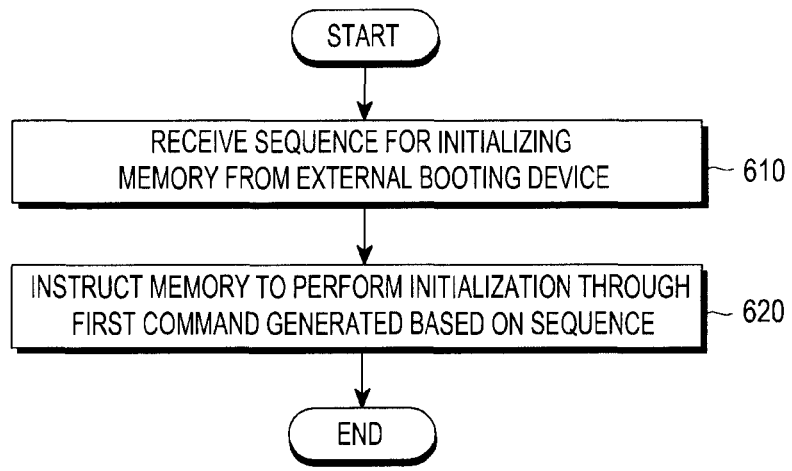
FIG. 6 is a flowchart of an example of a process, according to an embodiment of the present disclosure.

FIG. 6 is a flowchart of an example of a process, according to an embodiment of the present disclosure.

In operation 610, the electronic device 101 may receive a sequence for initializing the memory included in the electronic device 101 from the external booting device. The sequence may include at least one command to control the memory. When the memory has defects, the memory might not be controlled through an input through the firmware of the memory. Accordingly, the sequence may include at least one command for controlling the memory, which may be processed (e.g., executed) by the hardware logic of the memory in order to initialize the memory. For example, the hardware logic may be included in the controller controlling the memory.

In operation 620, the electronic device 101 may initialize the memory through a first command that is generated based on the sequence. The first command to instruct the initialization of the memory may be a command processed by the hardware logic of the memory and to control the memory. Accordingly, even when the memory has defects, the memory may be initialized through the first command.

As such, the electronic device 101 may cause the memory to be initialized without having to be removed from the PCB.

Figure 7:
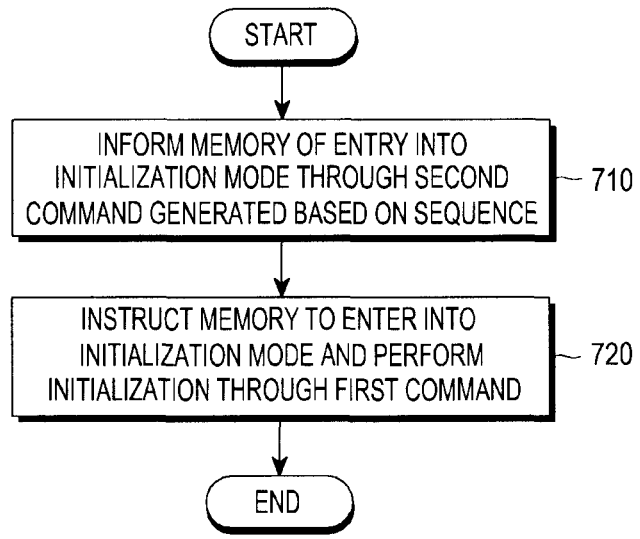
FIG. 7 is a flowchart of an example of a process, according to an embodiment of the present disclosure.

FIG. 7 is a flowchart of an example of a process, according to an embodiment of the present disclosure.

In operation 710, the electronic device 101 may inform the memory of intent to enter into an initialization mode for performing the initialization through a second command that is generated based on the sequence. The initialization mode may be a mode for initializing the memory. After the memory enters into the initialization mode, the initialization may be conducted. In operation 720, the electronic device 101 may instruct the memory to enter into the initialization mode and conduct initialization through the first command. The memory initialization is a scheme for restoring the defective memory and may be a process for turning the memory back to the factory state as produced in the manufacturing process.

According to aspects of the disclosure, the argument of the first command may indicate the authentication key corresponding to the authentication process for entry into the initialization mode. The authentication key may be a signature or security key corresponding to the manufacturer of the memory.

Figure 8:
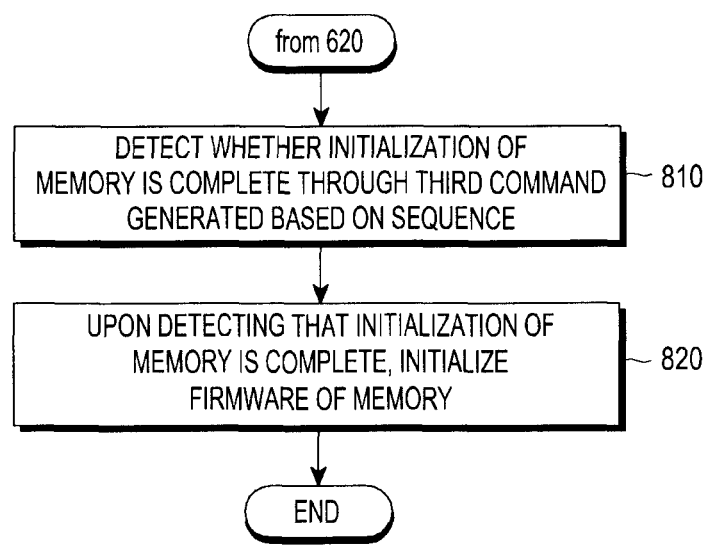
FIG. 8 is a flowchart of an example of a process, according to an embodiment of the present disclosure.

FIG. 8 is a flowchart of an example of a process, according to an embodiment of the present disclosure.

In operation 810, the electronic device 101, after causing the memory to be initialized, may detect whether the initialization of the memory is complete through a third command that is generated based on the sequence. When it is detected through the third command that the initialization of the memory is not complete, the electronic device 101 may periodically issue the third command to the memory in order to detect whether the initialization of the memory is complete.

In operation 820, upon detecting through the third command that the initialization of the memory is complete, the electronic device 101 may initialize the firmware of the memory. When the memory is initialized, the electronic device 101 may perform the process of initializing the firmware of the initialized memory.

Figure 9:
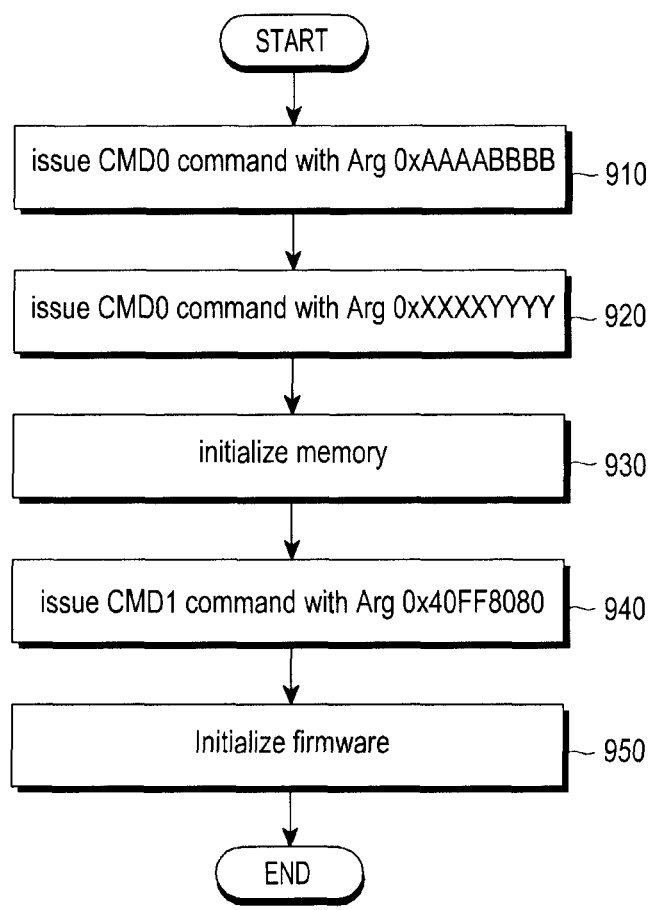
FIG. 9 is a flowchart of an example of a process, according to an embodiment of the present disclosure.

FIG. 9 is a flowchart of an example of a process, according to an embodiment of the present disclosure.

Described with respect to FIG. 9 is a process for initializing a memory through a command generated according to a sequence for initializing the memory according to an embodiment of the present disclosure.

In operation 910, the electronic device 101 may issue to the memory a CMD0 command and an Arg 0xAAAABBBB. The CMD0 command may be processed by the hardware logic of the memory to receive a response from the memory without involving the firmware of the memory. In other words, the CMD0 command may be processed (e.g., executed) by the hardware logic of the memory to directly control the memory. For example, the CMD0 command may be a hardware-like command for controlling the memory through at least one control circuit included in the memory.

The command CMD0 command when issued with the Arg 0xAAAABBBB argument may indicate to the memory an intent to enter into the initialization mode. The memory may prepare for entry into the initialization mode in response to the command. As the argument, 0xAAAABBBB, a value defined in the standards or previously set for entry into the initialization mode for each manufacturer of the memory may come in availability.

In operation 920, the electronic device 101 may issue to the memory a CMD0 command together with an Arg 0xXXXXYYYY argument. The CMD0 command when issued with the Arg 0xXXXXYYYY argument may cause the memory to enter the initialization mode. Thus, the memory may enter into the initialization mode in response to the command and initialization may proceed. The 0xXXXXYYYY argument may be a signature or security key value set depending on the manufacturer of the memory.

In operation 930, the memory may be initialized corresponding to commands received from the electronic device 101. The initialization of the memory is a scheme for restoring the defective memory and may be a process for turning the memory back to the factory state as produced in the manufacturing process.

In operation 940, the electronic device 101 may issue to the memory a CMD1 command along with an Arg 0x40FF8080 argument. The electronic device 101 may identify whether the initialization of the memory is complete through the command. Upon detecting that the initialization of the memory is incomplete, the processing module 420 may periodically issue the latter command to the memory. The 0x40FF8080 argument is for purposes of description only, and embodiments of the present disclosure are not limited thereto.

In operation 950, the electronic device 101 may perform initialization of the firmware of the memory. When the memory is initialized, the firmware may be initialized for driving the memory.

Through the process described in connection with FIG. 9, the electronic device 101 may initialize the memory even without removing the memory from the PCB when the memory has defects. Further, the commands and arguments used in each process described in connection with FIG. 9 are provided only for the purpose of description, and embodiments of the present disclosure are not limited thereto.

Figure 10:
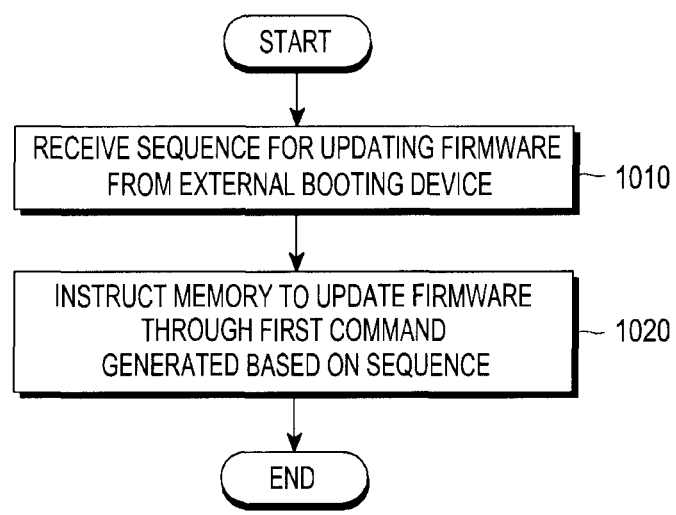
FIG. 10 is a flowchart of an example of a process, according to an embodiment of the present disclosure.

FIG. 10 is a flowchart of an example of a process, according to an embodiment of the present disclosure.

In operation 1010, the electronic device 101 may receive a sequence for updating the firmware from an external booting device. When the firmware of the memory included in the electronic device 101 is damaged or contains errors, the electronic device 101 might not work properly. In such instances, the electronic device 101 may access the memory through the boot loader stored in the external booting device.

The sequence may include at least one command for controlling the memory. When the firmware is corrupt or contains errors, the firmware might not be able to operate normally. Thus, there may be included at least one command for controlling the memory and processed by the hardware logic of the memory.

In operation 1020, the electronic device 101 may instruct the memory to update the firmware through the first command that is generated based on the sequence. The first command may be a command for controlling the memory without using the firmware. Accordingly, even when the firmware is corrupt or contains errors, the firmware may be updated through the first command.

As such, the electronic device 101 may instruct the memory to update the firmware so that the update of the firmware proceeds without even initializing the memory.

Figure 11:
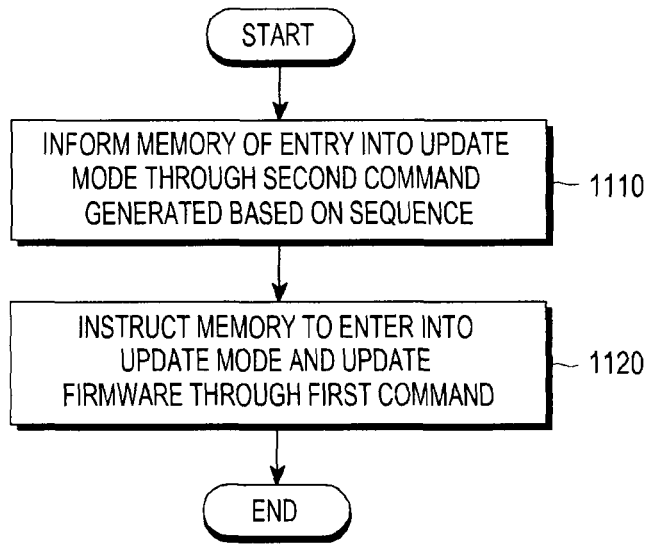
FIG. 11 is a flowchart of an example of a process, according to an embodiment of the present disclosure.

FIG. 11 is a flowchart of an example of a process, according to an embodiment of the present disclosure.

In operation 1110, the electronic device 101 may inform the memory of intent to enter into an update mode through a second command that is generated based on the sequence. The memory may prepare for entry into the update mode in response to the second command. The update mode may be a mode for updating the firmware. After the memory enters into the update mode, the firmware may be updated.

In operation 1120, the electronic device 101 may instruct the memory to enter into the update mode and update its firmware through the first command. The electronic device 101 may cause the memory to enter the update mode through the first command and may instruct the memory to update the firmware in the update mode. The argument of the first command may include an authentication key for entry into the update mode. The authentication key may be a signature or security key value corresponding to the manufacturer of the memory.

Figure 12:
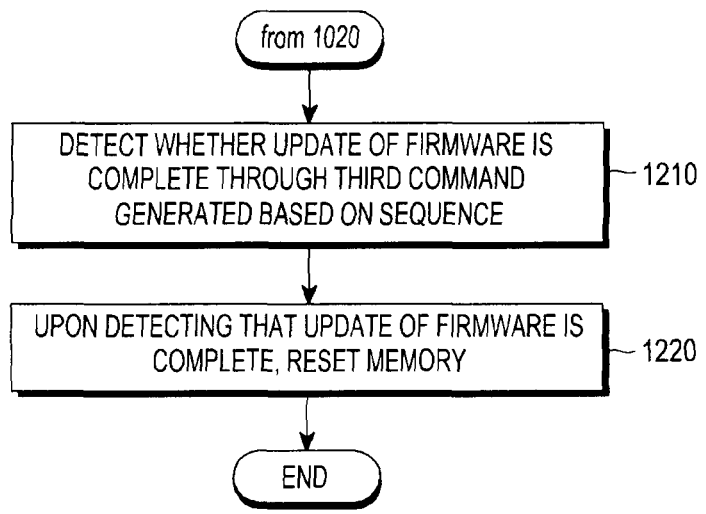
FIG. 12 is a flowchart of an example of a process, according to an embodiment of the present disclosure.

FIG. 12 is a flowchart of an example of a process, according to an embodiment of the present disclosure.

In operation 1210, the electronic device 101, after instructing the memory to update its firmware, may detect whether the update of the firmware is complete through a third command that is generated based on the sequence. When it is detected through the third command that the update of the firmware is not complete, the electronic device 101 may periodically issue the third command to the memory in order to detect whether the update of the firmware is complete.

In operation 1220, upon detecting through the third command that the update of the firmware is complete, the electronic device 101 may reset the memory. The electronic device 101 may reset the memory in order to operate the memory as the firmware is updated.

Figure 13:
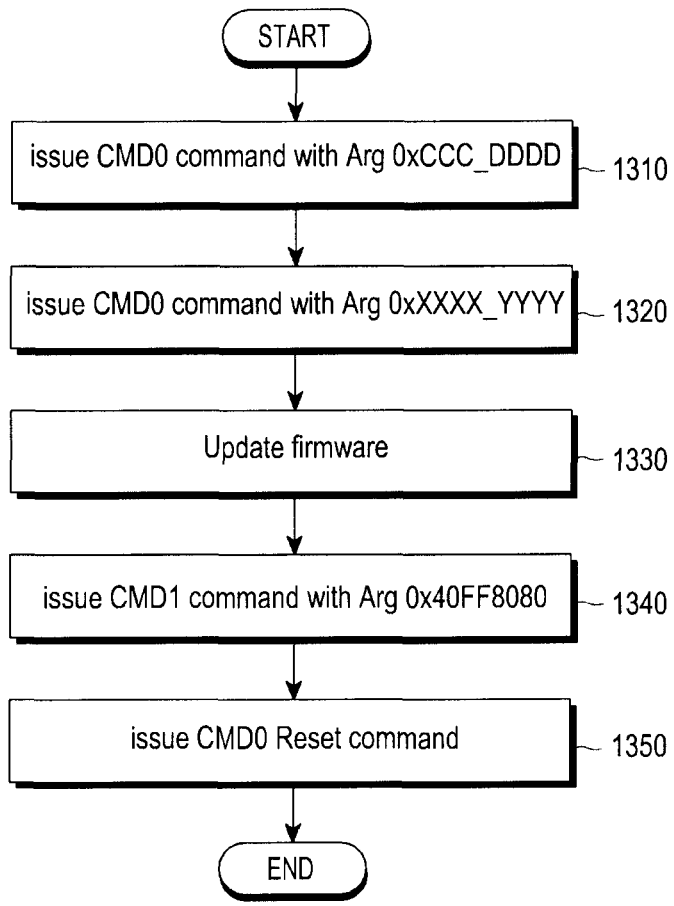
FIG. 13 is a flowchart of an example of a process, according to an embodiment of the present disclosure.

FIG. 13 is a flowchart of an example of a process, according to an embodiment of the present disclosure.

Described with respect to FIG. 13 is a process for updating firmware through a command generated according to a sequence for updating the firmware according to an embodiment of the present disclosure.

In operation 1310, the electronic device 101 may issue to the memory a CMD0 command along with an Arg 0xCCC_DDDD argument. The CMD0 command may be processed (e.g., executed) by the hardware logic of the memory and a response may be received from the memory. The CMD0 command and the Arg 0xCCC_DDDD may inform the memory of intent to enter into the update mode. The memory may prepare for entry into the update mode in response to the command. As the argument, 0xCCC_DDDD, a value defined in the standards or previously set for entry into the update mode for each manufacturer of the memory may come in availability.

In operation 1320, the electronic device 101 may issue to the memory a CMD0 command and an Arg 0xXXXX_YYYY argument. The CMD0 command and the Arg 0xXXXX_YYYY argument may cause the memory to enter into the update mode. Thus, the memory may enter into the update mode in response to the CMD0 command and the Arg 0xXXXX_YYYY argument, and the firmware may be updated. In some implementations, the 0xXXXX_YYYY argument may be a signature or security key value set by the manufacturer of the memory.

In operation 1330, the firmware may be updated corresponding to commands received from the electronic device 101. The update of the firmware may be a scheme for restoring the firmware having corruption or errors.

In operation 1340, the electronic device 101 may issue to the memory a CMD1 command along with an Arg 0x40FF8080 argument. The electronic device 101 may detect whether the update of the firmware is complete through the command. Upon identifying that the update of the firmware is incomplete, the processing module 420 may periodically issue the latter command to the memory. The 0x40FF8080 argument is for purposes of description only, and embodiments of the present disclosure are not limited thereto.

In operation 1350, the electronic device 101 may reset the memory through the CMD0 RESET command. The electronic device 101 may reset the memory in order to operate the memory after the firmware is updated.

Through the process described in connection with FIG. 13, the electronic device 101 may update the firmware even without initializing the memory when the firmware is corrupt or contains errors. Further, the commands and arguments used in each process described in connection with FIG. 13 are provided only for the purpose of description, and embodiments of the present disclosure are not limited thereto.

Figure 14:
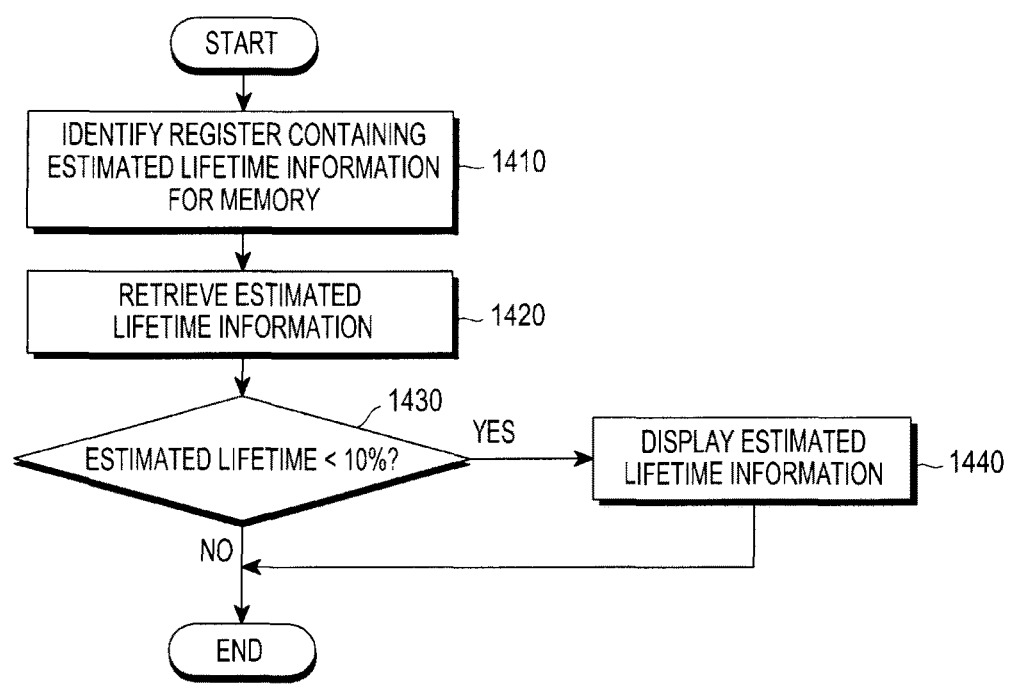
FIG. 14 is a flowchart of an example of a process, according to an embodiment of the present disclosure.

FIG. 14 is a flowchart of an example of a process, according to an embodiment of the present disclosure.

In an embodiment, the electronic device 101 may display estimated lifetime information for the memory to the user. For example, the electronic device 101 may obtain the lifetime information on the memory through a smart or health report as defined in the standards. The electronic device 101 may reserve user data and prevent failure to initialize the memory by providing the lifetime information to the user before the memory has defects using the lifetime information.

Further, the electronic device 101 may identify the erase count or band block count in the single level cell (SLC), multi-level cell (MLC), and triple-level cell (TLC) regions through the secure smart report, and the erase count or the bad block count information may be used to prevent the memory from being defective. For example, the following Table 1 represents lifetime information included in the smart report defined in the MMC standards.

TABLE 1

| Name | Field | Size (Byte) | CSD-Slice | Cell Type |
|---|---|---|---|---|
| Device Version | DEVICE_VERSION | 1 | [259] | R |
| CTRL Version | CTRL_VERSION | 1 | [258] | R |
| Optimal Erase Size | OPT_ERASE_SIZE | 1 | [257] | R |
| Optimal Write Size | OPT_WRITE_SIZE | 1 | [256] | R |

TABLE 1-continued

| Name | Field | Size (Byte) | CSD-Slice | Cell Type |
|---|---|---|---|---|
| Pre-EOL Information | PRE_EOL_INFO | 1 | [255] | R |
| Device Lifetime Estimation Value | LIFE_TIME_EST | 1 | [254] | R |

As shown in Table 1, the smart report may be included in the EXT_CSD register. The electronic device 101 may identify the information included in the smart report by issuing to the memory a CMD8 command. For example, the electronic device 101 may provide the estimated lifetime information to the user by identifying the "Device Lifetime Estimation Value." A method for providing lifetime information to the user is as follows.

In operation 1410, the electronic device 101 may identify the register containing the estimated lifetime information for the memory. For example, the electronic device 101 may identify the EXT_CSD register by issuing the CMD8 command.

In operation 1420, the electronic device 101 may retrieve the estimated lifetime information from the register. For example, the electronic device 101 may identify the "Device Lifetime Estimation Value" included in the EXT_CSD register.

In operation 1430, the electronic device 101 may detect whether the estimated lifetime information is less than 10 percent with respect to the initial state of the memory. Here, the 10 percent is a reference for determining whether to display the estimated lifetime information to the user and this value may be previously set. When the estimated lifetime information is not less than 10 percent with respect to the initial state of the memory, the estimated lifetime information might not be displayed to the user.

In operation 1440, when the estimated lifetime information is less than 10 percent with respect to the initial state of the memory, the electronic device 101 may display the estimated lifetime information to the user.

As described above, the electronic device 101 may reserve the user data and prevent failure to initialize the memory by providing the information related to the lifetime of the memory to the user. Further, the commands and arguments used in each process described in connection with FIG. 14 are provided only for the purpose of description, and embodiments of the present disclosure are not limited thereto.

According to an embodiment of the present disclosure, a method for initializing a memory embedded in an electronic device comprises receiving a sequence for initializing the memory from an external booting device, the sequence including at least one command for controlling the memory, and instructing the memory to perform initialization through a first command that is generated based on the sequence.

According to an embodiment of the present disclosure, the at least one command for controlling the memory may be a command processed by a hardware logic of the memory.

According to an embodiment of the present disclosure, the sequence may include an order of at least one command for initializing the memory and the respective opcode and argument of the at least one command.

According to an embodiment of the present disclosure, the first command may be one of at least one command processed by a hardware logic of the memory and to control the memory.

According to an embodiment of the present disclosure, instructing the initialization may include informing the memory of entry into an initialization mode for performing the initialization through a second command generated based on the sequence and instructing the memory to enter into the initialization mode and perform the initialization through the first command.

According to an embodiment of the present disclosure, each of the first command and the second command may be one of at least one command processed by a hardware logic of the memory and to control the memory.

According to an embodiment of the present disclosure, an argument of the first command may indicate an authentication key for initializing the memory.

According to an embodiment of the present disclosure, the method may further comprise identifying whether the initialization of the memory is complete through a third command generated based on the sequence.

According to an embodiment of the present disclosure, the method may further comprise, upon identifying that the initialization of the memory is complete through the third command, instructing initialization of firmware of the memory.

According to an embodiment of the present disclosure, an electronic device may comprise a memory embedded in the electronic device and a processor receiving a sequence for initializing the memory from an external booting device, the sequence including at least one command for controlling the memory, and instructing the memory to perform initialization through a first command generated based on the sequence.

According to an embodiment of the present disclosure, the at least one command for controlling the memory may be a command processed by a hardware logic of the memory.

According to an embodiment of the present disclosure, the sequence may include an order of at least one command for initializing the memory and the respective opcode and argument of the at least one command.

According to an embodiment of the present disclosure, the first command may be one of at least one command processed by a hardware logic of the memory and to control the memory.

According to an embodiment of the present disclosure, the processor may inform the memory of entry into an initialization mode for performing the initialization through a second command generated based on the sequence and instruct the memory to enter into the initialization mode and perform the initialization through the first command.

According to an embodiment of the present disclosure, each of the first command and the second command may be one of at least one command processed by a hardware logic of the memory and to control the memory.

According to an embodiment of the present disclosure, an argument of the first command may indicate an authentication key for initializing the memory.

According to an embodiment of the present disclosure, the processor may identify whether the initialization of the memory is complete through a third command generated based on the sequence.

According to an embodiment of the present disclosure, the processor, upon identifying that the initialization of the memory is complete through the third command, may instruct initialization of firmware of the memory.

According to an embodiment of the present disclosure, a method for updating the firmware of a memory may comprise receiving a sequence for updating the firmware from an external booting device, the sequence including at least one command for controlling the memory, and instructing the memory to update the firmware through a first command generated based on the sequence.

According to an embodiment of the present disclosure, the at least one command for controlling the memory may be a command processed by a hardware logic of the memory.

According to an embodiment of the present disclosure, the sequence may include an order of at least one command for updating the firmware and the respective opcode and argument of the at least one command.

According to an embodiment of the present disclosure, the first command may be one of at least one command processed by a hardware logic of the memory and to control the memory.

According to an embodiment of the present disclosure, instructing to update the firmware may include informing the memory of entry into an update mode for updating the firmware through a second command generated based on the sequence and instructing the memory to enter into the update mode and update the firmware through the first command.

According to an embodiment of the present disclosure, each of the first command and the second command may be one of at least one command processed by a hardware logic of the memory and to control the memory.

According to an embodiment of the present disclosure, an argument of the first command may indicate an authentication key for updating the firmware.

According to an embodiment of the present disclosure, the method may further comprise identifying whether the update of the firmware is complete through a third command generated based on the sequence.

According to an embodiment of the present disclosure, the method may further comprise, upon identifying that the update of the firmware is complete through the third command, instructing to reset the memory.

According to an embodiment of the present disclosure, an electronic device may comprise an embedded memory and a processor receiving a sequence for updating firmware driving the memory from an external booting device, the sequence including at least one command for controlling the memory, and instructing the memory to update the firmware through a first command generated based on the sequence.

According to an embodiment of the present disclosure, the at least one command for controlling the memory may be a command processed by a hardware logic of the memory.

According to an embodiment of the present disclosure, the sequence may include an order of at least one command for updating the firmware and the respective opcode and argument of the at least one command.

According to an embodiment of the present disclosure, the first command may be one of at least one command processed by a hardware logic of the memory and to control the memory.

According to an embodiment of the present disclosure, the processor may inform the memory of entry into an update mode for updating the firmware through a second command generated based on the sequence and instruct the memory to enter into the update mode and update the firmware through the first command.

According to an embodiment of the present disclosure, each of the first command and the second command may be one of at least one command processed by a hardware logic of the memory and to control the memory.

According to an embodiment of the present disclosure, an argument of the first command may indicate an authentication key for updating the firmware.

According to an embodiment of the present disclosure, the processor may identify whether the update of the firmware is complete through a third command generated based on the sequence.

According to an embodiment of the present disclosure, the processor, upon identifying that the update of the firmware is complete through the third command, may reset the memory.

Figure 15:
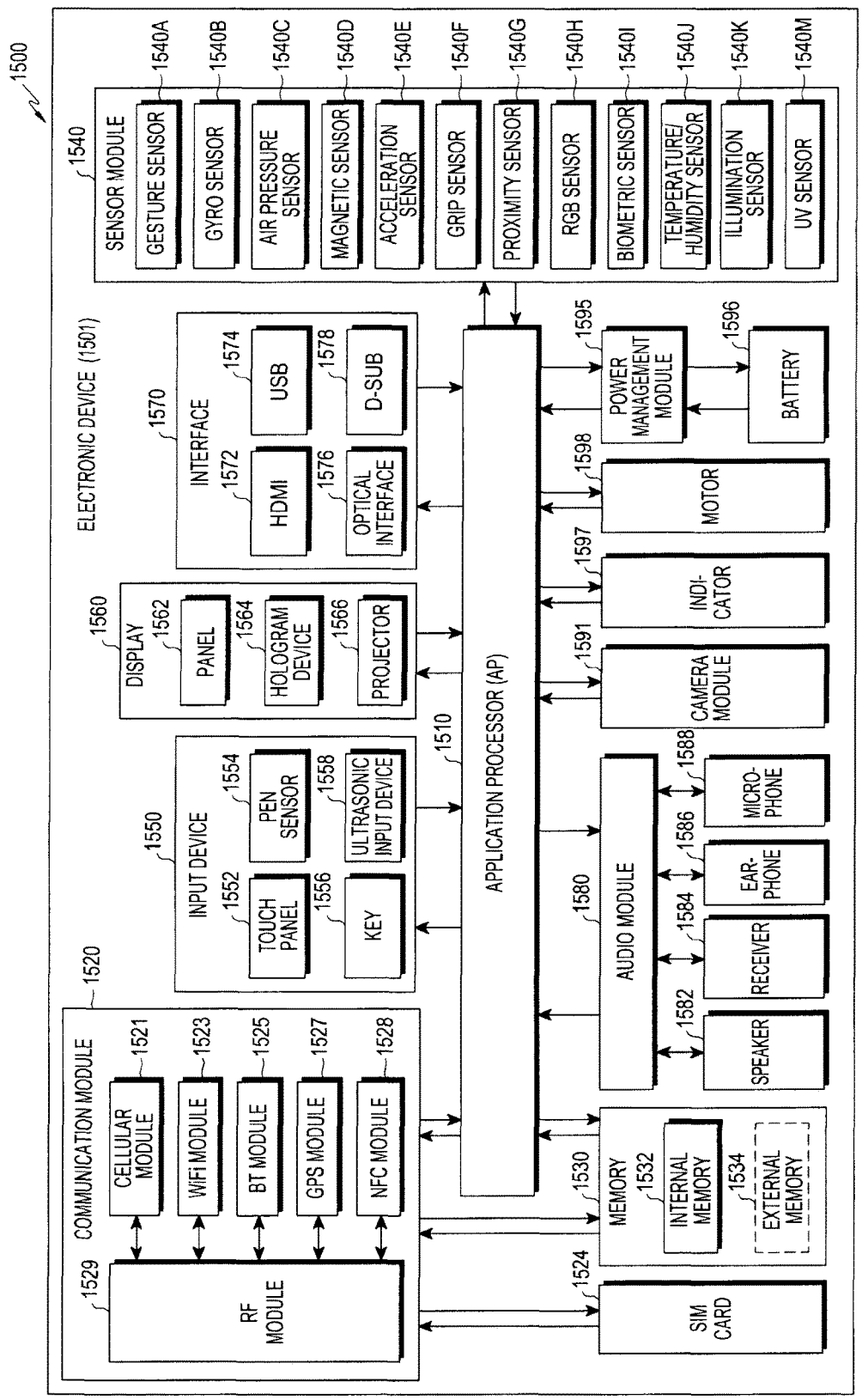
FIG. 15 is a block diagram of an example an electronic device, according to an embodiment of the present disclosure.

FIG. 15 is a block diagram 1500 of an example of an electronic device 1501, according to an embodiment of the present disclosure. The electronic device 1501 may include the whole or part of the configuration of, e.g., the electronic device 101 shown in FIG. 1. For example, the electronic device 101 shown in FIG. 1 may include the whole or part of the electronic device 101 shown in FIG. 15. The electronic device 1501 may include one or more application processors (APs) 1510, a communication module 1520, a subscriber identification module (SIM) card 1524, a memory 1530, a sensor module 1540, an input device 1550, a display 1560, an interface 1570, an audio module 1580, a camera module 1591, a power management module 1595, a battery 1596, an indicator 1597, and a motor 1598.

The AP 1510 may control multiple hardware and software components connected to the AP 1510 by running, e.g., an operating system or application programs, and the AP 1510 may process and compute various data. The AP 1510 may be implemented in, e.g., a system on chip (SoC). According to an embodiment of the present disclosure, the AP 1510 may further include a graphic processing unit (GPU) and/or an image signal processor. The AP 1510 may include at least some (e.g., the cellular module 1521) of the components shown in FIG. 14. The AP 1510 may load a command or data received from at least one of other components (e.g., a non-volatile memory) on a volatile memory, process the command or data, and store various data in the non-volatile memory.

The communication module 1520 may have the same or similar configuration to the communication interface 170 of FIG. 1. The communication module 1520 may include, e.g., a cellular module 1521, a wireless fidelity (Wi-Fi) module 1523, a Bluetooth (BT) module 1525, a global positioning system (GPS) module 1527, a near-field communication (NFC) module 1528, and a radio frequency (RF) module 1529.

The cellular module 1521 may provide voice call, video call, text, or Internet services through a communication network (e.g., a long-term evolution (LTE), LTE-advanced (LTE-A), code division multiple access (CDMA), wideband CDMA (WCDMA), universal mobile telecommunications system (UMTS), wireless broadcast (WiBro), or global system for mobile communications (GSM) network). According to an embodiment of the present disclosure, the cellular module 1521 may perform identification or authentication on the electronic device 1501 in the communication network using a subscriber identification module (e.g., the SIM card 1524). According to an embodiment of the present disclosure, the cellular module 1521 may perform at least some of the functions providable by the AP 1510. According to an embodiment of the present disclosure, the cellular module 1521 may include a communication processor (CP).

The Wi-Fi module 1523, the BT module 1525, the GPS module 1527, or the NFC module 1528 may include a process for, e.g., processing data communicated through the module. At least some (e.g., two or more) of the cellular module 1521, the Wi-Fi module 1523, the BT module 1525, the GPS module 1527, and the NFC module 1528 may be included in a single integrated circuit (IC) or an IC package.

The RF module 1529 may communicate, e.g., communication signals (e.g., RF signals). The RF module 1529 may include, e.g., a transceiver, a power amp module (PAM), a frequency filter, a low noise amplifier (LNA), or an antenna. According to an embodiment of the present disclosure, at least one of the cellular module 1521, the Wi-Fi module 1523, the BT module 1525, the GPS module 1527, or the NFC module 1528 may communicate RF signals through a separate RF module.

The SIM card 1524 may include, e.g., a card including a subscriber identification module and/or an embedded SIM, and may contain unique identification information (e.g., an integrated circuit card identifier (ICCID) or subscriber information (e.g., an international mobile subscriber identity (IMSI)).

The memory 1530 (e.g., the memory 130) may include, e.g., an internal memory 1532 or an external memory 1534. The internal memory 1532 may include at least one of, e.g., a volatile memory (e.g., a dynamic RAM (DRAM), a static RAM (SRAM), a synchronous dynamic RAM (SDRAM), etc.) or a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD).

The external memory 1534 may include a flash drive, e.g., a compact flash (CF) memory, a secure digital (SD) memory, a micro-SD memory, a min-SD memory, an extreme digital (xD) memory, or a Memory Stick™. The external memory 1534 may be functionally and/or physically connected to the electronic device 1501 via various interfaces.

For example, the sensor module 1540 may measure a physical quantity or detect an operational state of the electronic device 1501, and the sensor module 940 may convert the measured or detected information into an electrical signal. The sensor module 1540 may include at least one of, e.g., a gesture sensor 1540A, a gyro sensor 1540B, an air pressure sensor 1540C, a magnetic sensor 1540D, an acceleration sensor 1540E, a grip sensor 1540F, a proximity sensor 1540G, a color sensor 1540H such as an red-green-blue (RGB) sensor, a biosensor 1540I, a temperature/humidity sensor 1540J, an illumination sensor 1540K, or an ultraviolet (UV) sensor 1540M. Additionally or alternatively, the sensing module 1540 may include, e.g., an E-nose sensor, an electromyography (EMG) sensor, an electroencephalogram (EEG) sensor, an electrocardiogram (ECG) sensor, an infrared (IR) sensor, an iris sensor, or a fingerprint sensor. The sensor module 1540 may further include a control circuit for controlling at least one or more of the sensors included in the sensing module. According to an embodiment of the present disclosure, the electronic device 1501 may further include a processor configured to control the sensor module 1540 as part of an AP 1510 or separately from the AP 1510, and the electronic device 1501 may control the sensor module 1540 while the AP is in a sleep mode.

The input unit 1550 may include, e.g., a touch panel 1552, a (digital) pen sensor 1554, a key 1556, or an ultrasonic input device 1558. The touch panel 1552 may use at least one of capacitive, resistive, infrared, or ultrasonic methods. The touch panel 1552 may further include a control circuit. The touch panel 1552 may further include a tactile layer and may provide a user with a tactile reaction.

The (digital) pen sensor 1554 may include, e.g., a part of a touch panel or a separate sheet for recognition. The key 1556 may include e.g., a physical button, optical key or keypad. The ultrasonic input device 1558 may use an input tool that generates an ultrasonic signal and enable the electronic device 1501 to identify data by sensing the ultrasonic signal with a microphone (e.g., a microphone 1588).

The display 1560 (e.g., the display 160) may include a panel 1562, a hologram device 1564, or a projector 1566. The panel 1562 may have the same or similar configuration to the display 160 of FIG. 1. The panel 1562 may be implemented to be flexible, transparent, or wearable. The panel 1562 may also be incorporated with the touch panel 1552 in a module. The hologram device 1564 may make three-dimensional (3D) images (holograms) in the air by using light interference. The projector 1566 may display an image by projecting light onto a screen. The screen may be, for example, located inside or outside of the electronic device 1501. In accordance with an embodiment, the display 1560 may further include a control circuit to control the panel 1562, the hologram device 1564, or the projector 1566.

The interface 1570 may include e.g., a high definition multimedia Interface (HDMI) 1572, a USB 1574, an optical interface 1576, or a D-subminiature (D-sub) 1578. The interface 1570 may be included in e.g., the communication interface 170 shown in FIG. 1. Additionally or alternatively, the interface 1570 may include a Mobile High-definition Link (MHL) interface, a secure digital (SD) card/multimedia card (MMC) interface, or IrDA standard interface.

The audio module 1580 may convert a sound into an electric signal or vice versa, for example. At least a part of the audio module 1580 may be included in e.g., the electronic device 101 as shown in FIG. 1. The audio module 1580 may process sound information input or output through e.g., a speaker 1582, a receiver 1584, an earphone 1586, or a microphone 1588.

For example, the camera module 1591 may be a device for capturing still images and videos, and may include, according to an embodiment of the present disclosure, one or more image sensors (e.g., front and back sensors), a lens, an image signal processor (ISP), or a flash such as a light emitting diode (LED) or xenon lamp.

The power manager module 1595 may manage power of the electronic device 1501, for example. Although not shown, according to an embodiment of the present disclosure, a power management integrated circuit (PMIC), a charger IC, or a battery or fuel gauge is included in the power manager module 1595. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 1596, a voltage, a current, or a temperature while the battery 1596 is being charged. The battery 1596 may include, e.g., a rechargeable battery or a solar battery.

The indicator 1597 may indicate a particular state of the electronic device 1501 or a part of the electronic device (e.g., the AP 1510), including e.g., a booting state, a message state, or recharging state. The motor 1598 may convert an electric signal to a mechanical vibration and may generate a vibrational or haptic effect. Although not shown, a processing unit for supporting mobile TV, such as a GPU may be included in the electronic device 1501. The processing unit for supporting mobile TV may process media data conforming to a standard for digital multimedia broadcasting (DMB), digital video broadcasting (DVB), or mediaFLO™.

Each of the aforementioned components of the electronic device may include one or more parts, and a name of the part may vary with a type of the electronic device. The electronic device in accordance with various embodiments of the present disclosure may include at least one of the aforementioned components, omit some of them, or include other additional component(s). Some of the components may be combined into an entity, but the entity may perform the same functions as the components may do.

The term 'module' may refer to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of application specific integrated circuit (ASIC) chips, field programmable gate arrays (FPGAs), or programmable logic arrays (PLAs) that perform some operations, which have already been known or will be developed in the future.

According to an embodiment of the present disclosure, at least a part of the device (e.g., modules or their functions) or method (e.g., operations) may be implemented as instructions stored in a computer-readable storage medium e.g., in the form of a program module. The instructions, when executed by a processor (e.g., the processor 120), may enable the processor to carry out a corresponding function. The computer-readable storage medium may be e.g., the memory 130.

The computer-readable storage medium may include a hardware device, such as hard discs, floppy discs, and magnetic tapes (e.g., a magnetic tape), optical media such as compact disc read-only memories (ROMs) (CD-ROMs) and digital versatile discs (DVDs), magneto-optical media such as floptical disks, ROMs, random access memories (RAMs), flash memories, and/or the like. Examples of the program instructions may include not only machine language codes but also high-level language codes which are executable by various computing means using an interpreter. The aforementioned hardware devices may be configured to operate as one or more software modules to carry out exemplary embodiments of the present disclosure, and vice versa.

Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, simultaneously, repeatedly, or heuristically. Furthermore, some of the operations may be performed in a different order, or omitted, or include other additional operation(s).

According to an embodiment of the present disclosure, there is provided a storage medium storing instructions executed by at least one processor to enable the processor to perform at least one operation that may include receiving a sequence for initializing the memory from an external booting device, the sequence including at least one command for controlling the memory, and instructing the memory to perform initialization through a first command generated based on the sequence.

Further, the at least one operation may include receiving a sequence for updating the firmware from an external booting device, the sequence including at least one command for controlling the memory, and instructing the memory to update the firmware through a first command generated based on the sequence.

As is apparent to the foregoing description, according to an embodiment of the present disclosure, there may be provided a method for initializing the memory to address the problems of the memory without exchanging the PCB including the memory.

According to an embodiment of the present disclosure, there may be provided a method for updating the firmware of the memory without initializing the memory.

According to an embodiment of the present disclosure, the information on the estimated lifetime of the memory may be provided to the user.

FIGS. 1-15 are provided as an example only. At least some of the operations discussed with respect to these figures can be performed concurrently, performed in different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

Moreover, the embodiments disclosed in this specification are suggested for the description and understanding of technical content but do not limit the range of the present disclosure. Accordingly, the range of the present disclosure should be interpreted as including all modifications or various other embodiments based on the technical idea of the present disclosure.

What is claimed is:

1. A method for initializing for restoring defects of an embedded memory that is part of an electronic device, comprising:
   detecting a failure of a booting process for operating the electronic device;
   accessing a booting component of an external device which is inserted and electrically connected to the electronic device, wherein the external device includes a memory card;
   performing the booting process using the booting component of the external device;
   when the booting process is performed, receiving a sequence for initializing the embedded memory from the external device; and
   causing the embedded memory to perform initialization process by using at least one initialization command that is generated based on the sequence, wherein the initialization command includes a first command, a second command and a third command,
   wherein the causing the embedded memory to perform initialization process includes:
      transmitting, to the embedded memory, the first command which is indicating an intent to cause the embedded memory to enter into an initialization mode,
      transmitting, to the embedded memory, the second command which is causing the embedded memory to enter into the initialization mode and causing the embedded memory to perform an initialization of the embedded memory, and
      transmitting, to the embedded memory, the third command which is detecting whether the initialization of the embedded memory is complete, wherein the third command is transmitted periodically to the embedded memory until the initialization of the embedded memory according to the second command is complete.

2. The method of claim 1, wherein the initialization command for controlling the embedded memory that is executable by a hardware logic of the embedded memory.

3. The method of claim 1, wherein an argument of the second command includes an authentication key for initializing the embedded memory.

4. The method of claim 1, further comprising initializing a firmware of the embedded memory in response to detecting that the embedded memory is initialized.

5. An electronic device, comprising:
   an embedded memory in the electronic device; and
   at least one processor operatively coupled to the embedded memory, configured to:
      detect a failure of a booting process for operating the electronic device;
      access a booting component of an external device which is inserted and electrically connected to the electronic device, wherein the external device includes a memory card;
      perform the booting process using the booting component of the external device;
      receive a sequence for initializing the embedded memory from the external device; and
   cause the embedded memory to perform initialization process by using an initialization command that is generated based on the sequence, wherein the initialization command includes a first command, a second command and a third command,
   wherein the at least one processor is further configured to:
      transmit, to the embedded memory, the first command which is indicating an intent to cause the embedded memory to enter into an initialization mode,
      transmit, to the embedded memory, the second command which is causing the embedded memory to enter into the initialization mode and causing the embedded memory to perform an initialization of the embedded memory, and
      transmit, to the embedded memory, the third command which is detecting whether the initialization of the embedded memory is complete, wherein the third command is transmitted periodically to the embedded memory until the initialization of the embedded memory according to the second command is complete.

6. The electronic device of claim 5, wherein the initialization command for controlling the embedded memory that is executable by a hardware logic of the embedded memory.

7. The electronic device of claim 5, wherein an argument of the second command includes an authentication key for initializing the embedded memory.

8. The electronic device of claim 5, wherein the at least one processor is further configured to initialize a firmware of the embedded memory in response to detecting that the embedded memory is initialized.

* * * * *